United States Patent [19]

Basu

[11] Patent Number: 5,039,192
[45] Date of Patent: Aug. 13, 1991

[54] INTERCONNECTION MEANS FOR OPTICAL WAVEGUIDES

[75] Inventor: Santanu Basu, Arlington, Mass.

[73] Assignee: International Business Machines Corporation, Armonk, N.Y.

[21] Appl. No.: 546,077

[22] Filed: Jun. 29, 1990

[51] Int. Cl.$^5$ .............................................. G02B 6/30
[52] U.S. Cl. ...................................... 385/31; 385/49; 385/50
[58] Field of Search ............... 350/96.17, 96.12, 96.15, 350/96.13, 96.2, 96.1

[56] References Cited

U.S. PATENT DOCUMENTS

| | | | |
|---|---|---|---|
| 3,656,832 | 4/1972 | Judin | 350/90 R |
| 3,666,347 | 5/1972 | Kitano et al. | 350/96 B |
| 3,899,235 | 8/1975 | Arnaud et al. | 350/96.17 |
| 3,950,075 | 4/1976 | Cook et al. | 350/96 C |
| 4,097,117 | 6/1978 | Neil et al. | 350/96.17 |
| 4,109,997 | 8/1978 | Iverson | 350/96.10 |
| 4,257,672 | 3/1981 | Balliet | 350/96.20 |
| 4,304,461 | 12/1981 | Stewart et al. | 350/96.18 |
| 4,371,233 | 2/1983 | Masuda | 350/96.18 |
| 4,548,464 | 10/1985 | Auracher et al. | 350/96.14 |
| 4,712,854 | 12/1987 | Mikasai et al. | 350/96.12 |
| 4,796,969 | 1/1989 | Fantone | 350/96.18 |
| 4,934,783 | 6/1990 | Jacobson | 350/96.15 |

OTHER PUBLICATIONS

"Continuous-wave Laser Oscillation in a Nd:yAG Sphere": by T. Baer Optics Letters vol. 12, No. 6, Jun. 1987 pp. 392-394.

Primary Examiner—John D. Lee
Assistant Examiner—John Ngo
Attorney, Agent, or Firm—John J. Goodwin

[57] ABSTRACT

An interconnection structure for coupling light frequency signals into and out of a planar optical waveguide including a dielectric planar waveguide structure having at least two opposite parallel surfaces and through which light frequency signal modes are able to propagate by internal reflections from the surfaces resulting in zigzag paths through the waveguide structure which has a thickness h, and a refractive index of $n_w$. A coupling element composed of light transparent material is provided having a surface in contact with a surface of the planar waveguide structure at a first given contact area, the coupling element having a circular cross section and a refractive index of $n_s$ through which light frequency signal modes are able to propagate internally along chord paths in the coupling element by internal reflections from the surface of the coupling element, and wherein the internal reflections of the light frequency signal modes in the waveguide structure and in the coupling element are frustrated at the given area of contact such that light signal modes in the waveguide structure can enter and exit the waveguide structure and the coupling element at the contact area.

8 Claims, 1 Drawing Sheet

INTERCONNECTION MEANS FOR OPTICAL WAVEGUIDES

BACKGROUND OF THE INVENTION

1. Field of the Invention

The present invention relates to the interconnection of optical waveguides, and more particularly to structures for coupling light frequency signals to a waveguide or between two waveguides.

2. Description of the Prior Art

U.S. Pat. No. 3,656,832 issued Apr. 18, 1972 to Judin, entitled MICRO-OPTICAL IMAGING APPARATUS, describes a high speed, diffraction limited point or line forming optical system utilizing uncorrected and imperfect single element lenses which are substantially spherical, hemispherical or cylindrical in shape, or appropriate index and size, in conjunction with radiation or light waves incident at limited divergence angles upon said lens elements; by virtue of small optical path differences of focusing exit rays, a diffraction predominant effect occurs.

U.S. Pat. No. 3,666,347 issued May 30, 1972 to Kitano et al, entitled SPHERICAL LENS STRUCTURES, describes a glass sphere containing thallium and sodium cations is immersed in a bath of a molten salt containing at least one kind of metal cations such as potassium cations to cause ion exchange through the glass-salt contact surface in a manner such that the concentrations of the cations, which constitute modifying oxides within the glass, vary from the center toward the outer surface of the sphere, which thereupon becomes a spherical lens.

U.S. Pat. No. 3,950,075 issued Apr. 13, 1976 to Cook et al, entitled LIGHT SOURCE FOR OPTICAL WAVEGUIDE BUNDLE, describes a source of optical wave energy for an optical communication system. One end of an optical waveguide fiber bundle is disposed in light-receiving relationship with respect to light from a Lambertian-type light source such as a light emitting diode. A spherical bead of transparent material disposed between the diode and the fiber bundle endface provides a rugged and inexpensive optical device that tends to collimate the light emitted from the diode.

U.S. Pat. No. 4,109,997 issued Aug. 29, 1978 to Iverson, entitled OPTICAL SLIP RINGS, discusses optical slip rings which permit signals to be transferred from a rotating body to a non-rotating body without any physical contact. Fiber optic bundles are utilized to conduct light signals on one body to separate fiber optic bundles on the other body. Light is projected across a small gap from the rotating bundle to the non-rotating bundle. Other variations use multiple channels, wave guides, derotating prisms and concentric annular mirrors to achieve signal transfer. The optical slip rings can transfer any signal which may be converted to a light signal.

U.S. Pat. No. 4,257,672 issued Mar. 24, 1981 to Balliet, entitled OPTICAL COUPLER FOR CONNECTING A LIGHT SOURCE TO AN OPTICAL TRANSMISSION LINE, describes an optical coupler for optically coupling an LED to an optical fiber includes a transparent spherical core. The index of refraction of the core is greater than of the spherical shell. A surface is formed on the opposite side of the coupler for coupling the optical fiber the optical coupler, and a cylinder is used to mount the optical coupler at a predetermined distance from the LED in an orientation maximizing the amount of light entering the optical fiber.

U.S. Pat. No. 4,548,464 issued Oct. 22, 1985 to Auracher et al, entitled FREQUENCY ANALYZER IN PLANAR WAVEGUIDE TECHNOLOGY AND METHOD OF MANUFACTURE, discloses a frequency analyzer which is manufactured in a planar waveguide technology, has a first substrate provided with a waveguide modulator for modulating light travelling in the waveguide connected to a lens for the Fourier transformation of the modulated light. The material of the lens is different than the material of the substrate having the modulator and preferably is either a rod shaped gradient lens or a second substrate, which has a geodesic waveguide lens pressed into the surface.

U.S. Pat. No. 4,097,117 issued June 27, 1987 to Neil et al, entitled OPTICAL COUPLER HAVING IMPROVED EFFICIENCY, describes a structure wherein the optical efficiency, with which a coupling portion of a fiber-optic can be coupled by evanescent fields to a planar optical waveguide through a phase-matching diffraction grating on the surface of the planar optical waveguide, is increased by deforming the coupling portion so that it is a negative replica of the undulating surface of the diffraction grating.

U.S. Pat. No. 4,304,461 issued Dec. 8, 1981 to Stewart et al, entitled OPTICAL FIBRE CONNECTORS, discloses an optical fiber connector comprising in respect of each of the optical fibers to be connected, a connector body part formed at one end with a recess which accurately locates a sphere lens relative to an optical fiber receiving hole extending through the body part and terminating at the center of the recess whereby the axis of the optical fiber received by the hole and preferably bonded to the surface of the sphere lens. Connecting means is provided for connecting together in axial alignment two of the body parts with the sphere lenses of the parts arranged in opposed relationship.

U.S. Pat. No. 4,371,233 issued Feb. 1, 1983 to Masuda, entitled LENS-APPLIED OPTICAL FIBER CONNECTOR, discloses a lens-applied optical fiber connector used to connect optical fibers for optical communication. The lens-applied optical fiber connector is structured so that the optical fiber connectors are inserted into a lens-applied sleeve and the sleeve is inserted into an adapter. In the present invention, the focal length of the lens is selected to be 0.09 to 0.27 mm and the lens is positioned at the point on the optical axis of the optical fiber apart from the end surface of the fiber as far as the focal length.

U.S. Pat. No. 4,712,854 issued Dec. 15, 1987 to Mikami, entitled OPTICAL WAVEGUIDE AND METHOD OF MAKING THE SAME, discloses a method of making an optical waveguide. First, ultraviolet light is radiated upon the surface of a transparent piece of photopolymerization material of a type whose refractive index is changed by the impact of ultraviolet light thereon, so that a refractive index profile in the depthwise direction of the piece of photopolymerization material is formed. Next, ultraviolet light is radiated upon the surface of the transparent piece of photopolymerization material in a pattern of a lengthwise extending stripe whose intensity is least in its central portion and becomes greater towards its edge portions, so that a refractive index profile in the widthwise direction of the piece of photopolymerization material is formed. Finally, an optical waveguide is structured from the thus irradiated piece of photopolymerization material. Optionally, these profiles may be parabolic profiles. Optionally, also, the structuring of the final optical waveguide may be done by laminating together two similar such pieces of photopolymerization material, thus treated, with their sides which were exposed to ultraviolet radiation, in contact with one another.

U.S. Pat. No. 4,796,969 issued Jan. 10, 1989 to Fantone, entitled FIBER OPTIC RELAY CONNECTOR, describes a fiber optic connector in the form of a two-element relay system which transforms and matches the numerical apertures of an entering beam to that of the acceptance numerical aperture of the exiting optic where in general the numerical apertures can be different. In preferred form, the connector is a pair of spherical balls with their surfaces in contact at a point along an optical axis extending through the centers of the balls. The radii of the spherical balls and their material composition are such that they operate to image fibers or the like one onto the other with their numerical apertures matched when each of the fibers are in optical contact with a respective one of the spherical balls at a point along the optical axis opposite the point of contact.

T. Baer, "Continuous wave laser oscillation in a Nd-YAG sphere", Optics Letters, Vol. 12 (6), pages 392-394, 1987 describes a dye laser whose output beam is coupled into a spherical laser for pumping.

SUMMARY OF THE INVENTION

An object of the present invention is to provide an interconnection structure for coupling light signals onto a planar optical waveguide.

An other object of the present invention is to provide an interconnection structure for coupling light signals between two optical waveguides.

A further object of the present invention is to provide an interconnection means for optical planar waveguides using a transparent cylinder or spherical element.

Still another object of the present invention is to provide an interconnection system for optical waveguides using the technique of frustration of total internal reflection at the contact points between a sphere or cylinder and a planar waveguide for light coupling, and the technique of total internal reflection for light confinement.

DESCRIPTION OF THE PREFERRED EMBODIMENT

An interconnection system for optical waveguides is disclosed for either coupling light onto a planar waveguide or between two optical waveguides using a transparent cylinder or spherical element. The basic principle upon which the disclosure is based is frustration of total internal reflection at the contact points between a sphere or a cylinder with a planar waveguide for light coupling, and the confinement of the light within the sphere of the cylinder by means of total internal reflections. The coupling may also be due to evanescent fields. Light from an external source may also be injected into the cylinder or a sphere through a flattened side. Multiple spheres may be used for relay imaging.

Planar waveguides are important components in integrated optics. In most applications, however, it is necessary to bring the signal in and out of the waveguide. Prior art techniques include using integrated mirrors and gratings for this purpose. However, mirrors and gratings both involve extra processing steps in the waveguide fabrication process and once they are fabricated, their locations are fixed with respect to the waveguide. For measurement purposes, prism couplers are used either to couple in or to couple out the light to and from the waveguide. They are bulky, require very precise positional adjustment and are not suitable for interwaveguide communication. In the present invention, the symmetry of a spherical element is employed in structure for compact waveguide couplers. As a background to the present invention, the prior art Optics Letters article by T. Baer describes the first operation of a spherical Nd-YAG laser pumped by a dye laser. The dye laser beam was coupled into the sphere in two ways. In one method, the dye laser beam was incident tangential to the sphere and the refracted beam inside the sphere was at near the critical angle. In another method, a prism was used to touch the sphere at one point where the total internal reflection was frustrated and the light was introduced into the sphere at greater than the internal critical angle of the sphere.

In one embodiment of the present invention, light is coupled into and out of a waveguide by a transparent sphere. This embodiment is described with reference to FIGS. 1, 2 and 3.

Figure 1:
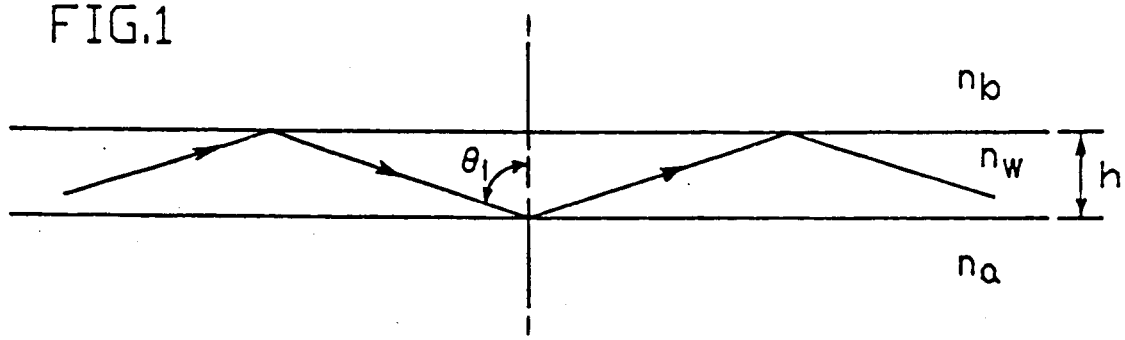
FIG. 1 is a schematic illustration of the cross section of a planar waveguide useful in describing the present invention.
Figure 2:
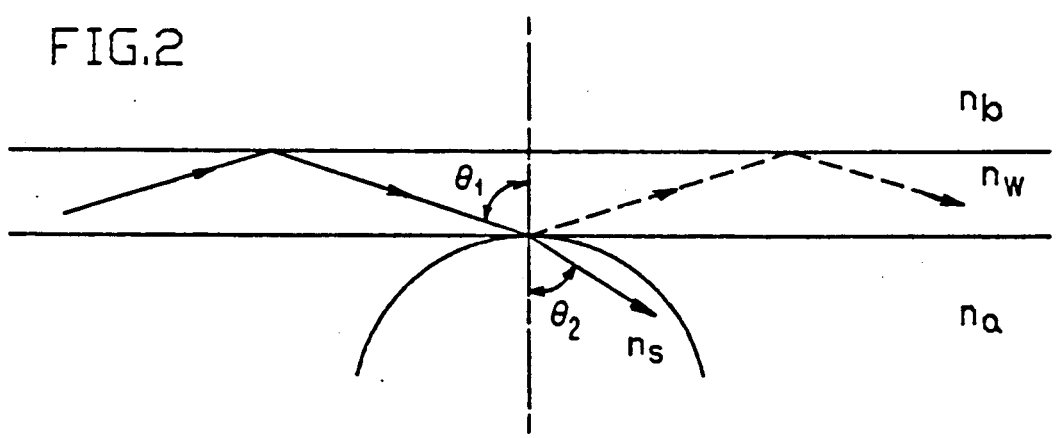
FIG. 2 is a schematic illustration of the cross section of a planar waveguide in contact with a spherical surface for light interconnection.

The modes in a dielectric waveguide may be analyzed by assuming propagation in a set of discrete zigzag paths through the waveguide as shown in FIG. 1. Referring to FIG. 2, the waveguide of FIG. 1 is in contact at one point with a sphere of refractive index $n_s$ which is higher than the refractive index $n_w$ of the waveguide. For waveguiding, $n_w > n_s$ where $n_a$ is the refractive index of the surrounding medium, which is usually air. If the position of the sphere is optimized, the total internal reflection in the waveguide for a particular mode is frustrated over a small region near the point of contact. This region is estimated to be of the order of 20 micron in diameter for a 5 mm diameter sphere. A number of other modes may also couple into the sphere at various angles. To enhance the coupling efficiency, an index matching fluid may be applied near the point of contact. In some applications, it is also possible to use a sphere for which the refractive index satisfies $n_a < n_s < n_w$ as long as the total internal reflection is frustrated in the vicinity of the point of contact.

Figure 3:
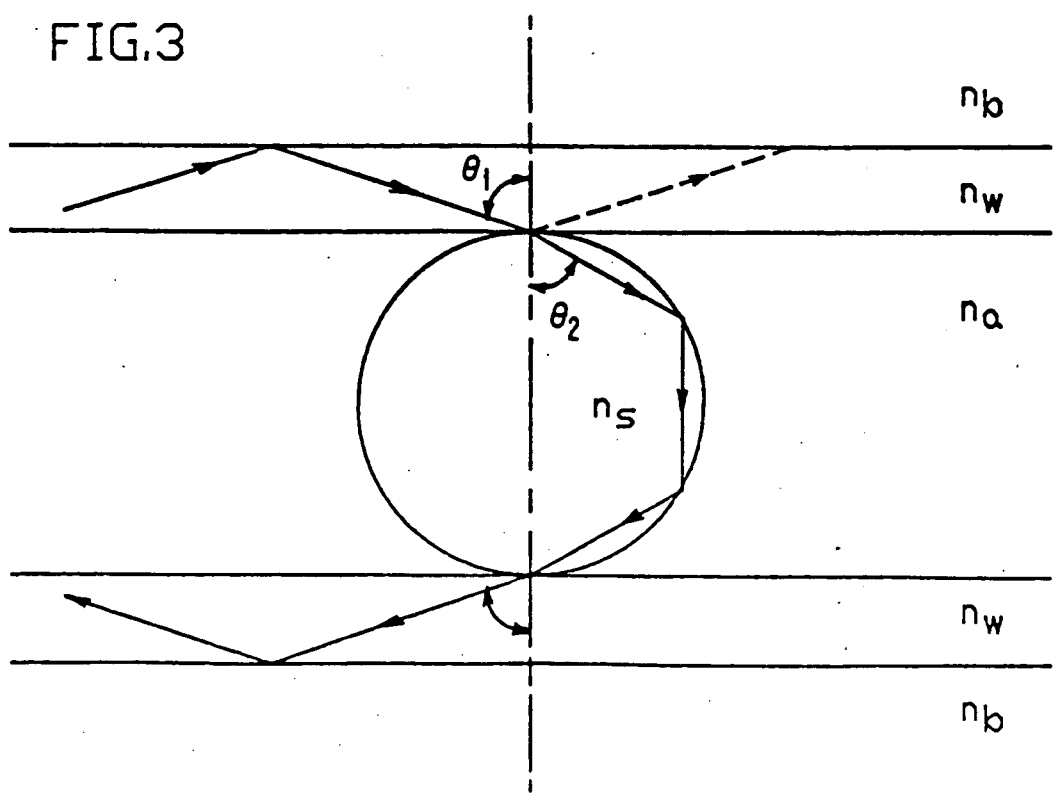
FIG. 3 is a schematic illustration of the cross section of two physically separated but optically connected planar waveguides unconnected by a spherical light coupler.

The light which is injected into the sphere, propagates along a chord and is either totally internally reflected as it reaches the spherical surface, or is partially reflected for some modes when $n_a < n_s < n_w$. The light propagates along chords in a plane and may make from less than one to multiple round trips around the sphere. Different modes of the waveguide are coupled in at different angles and they traverse different paths within the sphere. For coupling the light out of the sphere, a similar arrangement may be used which may involve another waveguide in contact with the sphere as shown in FIG. 3. The second waveguide may be connected to a laser, or a detector, or an optical logic element, for example. A prism may alternately be used for coupling out the light. One of the design criterion is the number of round trips the injected light makes before reaching the point of contact of the outgoing coupler. The design calculations for one spherical coupler embodiment is provided below. Various other designs should be apparent to one skilled in the art.

Referring to FIGS. 1, 2 and 3 for notation, the design calculations for a symmetric structure where the sphere couples two identical waveguides are given in the following. Let $\lambda$ be the vacuum wavelength and h be the guide thickness. Four quantities, N, b, a and V are defined as follows:

$$N = n_w \mathrm{Sine}\, \theta_1$$

$$b = (N^2 - n_b^2)/(n_w^2 - n_b^2)$$

$$a = (n_b^2 - n_a^2)/(n_w^2 - n_b^2)$$

$$V = \frac{2\pi h}{\lambda} \sqrt{n_w^2 - n_b^2}$$

The tranverse resonance condition gives b as a function of V for a given value. In general, a discrete number of propagation angles are allowed for a particular waveguide. For a mode with a propagation angle, $\theta_1$, the refracted angle in the sphere is given by $$\theta_2 = \mathrm{Sine}^{-1} \frac{N}{n_s}$$

For two reflections on the surface of the sphere before the beam meets the output coupler, $\theta_2 = 60°$, $\theta_1$ can be calculated for this particular value of $\theta_2$ and the waveguide thickness, h, may be designed to give this particular value of $\theta_1$.

For an arbitrary design and an anti-parallel out-coupling as shown in FIG. 1, the beam inside the sphere makes m reflections before it meets the output coupler. m is given by $m = (n\pi + \theta_2)/(2/\pi - \theta_2)$ where n is the smallest integer for which m is an integer.

If the angle $\theta_2$ is a little different from 60°, it is possible to tilt the output waveguide of FIG. 3 by a small amount, such that it meets the circulating beam after two reflections from the surface. Small deformation on the sphere and the waveguides may also be introduced for better coupling.

An embodiment of the present invention wherein light is coupled into and out of a waveguide by a transparent cylinder is also practical. In FIG. 2 and 3, the circular cross section illustrated may also be considered the cross section of a transparent cylinder.

The explanation of operation, the design calculations and the equations for N, b, a and V given for the spherical embodiment are also applicable for the cylindrical embodiment.

In a specific application using a transparent cylinder, a 5 mm diameter rutile cylinder with polished curved surface is brought into contact with a 50 micron wide polymeric waveguide of 5 micron depth. The waveguide is fabricated on a silicon wafer with the polymer used being a transparent epoxy. The waveguide is selected to support from five to seven spatial modes. Light from a He-Ne laser at 632.8 nm is coupled tangentially into the cylinder. The light which is coupled into the cylinder circulates within the cylinder being incident on the cylindrical surface at near total internal reflection angle at each point. Coupling of this circulating beam of light into the waveguide occurs at various values of included angle, $\alpha$ between the incident laser beam and the waveguide. For a particular polymeric waveguide, light coupling occurs for $47° < \alpha < 90°$ with the maximum coupling at near $\alpha = 72°$. The angle, $\alpha$, can not be increased beyond 90° because of external geometrical constraints. With a 125 micron polymeric waveguide, it was found that the angular tolerance in the perpendicular plan is 0.017°. For a 0.58 micron silicon nitride waveguide on silicon, the range of in-plane coupling angle is between 64° and greater than 78°. The coupling is not sensitive to the pressure applied between the cylinder and the waveguide.

Having thus described our invention, what we claim as new and desire to secure by Letters Patents is:

1. Interconnection structure for coupling light frequency signals into and out of a planar optical waveguide comprising at least a first dielectric planar waveguide means having at least two opposite parallel surfaces and through which light frequency signal modes are able to propagate by internal reflections from said surfaces resulting in zigzag paths through said waveguide means, said waveguide means being composed of material having a thickness h, and a refractive index of $n_w$, a coupling element composed of light transparent material having a surface in contact with a surface of said planar waveguide means at a first given contact area, said coupling element having a circular cross section and being composed of material having a refractive index of $n_s$ through which light frequency signal modes are able to propagate, said light frequency signal modes being able to propagate internally along chord paths in said coupling element by internal reflections from the surface of said coupling element, and wherein said internal reflections of said light frequency signal modes able to propagate in said waveguide means and in said coupling element are frustrated at said given area of contact such that light signal modes able to propagate in said waveguide means can enter and exit said waveguide means and said coupling element at said contact area.

2. An interconnection structure according to claim 1 wherein said coupling element is a sphere of light transparent material having a circular cross section, and wherein light frequency signal modes injected into said sphere propagate along chords of said sphere and are internally reflected from the surface of said sphere.

3. An interconnection structure according to claim 1 wherein said coupling element is a cylinder of light transparent material having a circular cross section, and wherein light frequency signal modes injected into said cylinder propagate along chords of said cylinder and are internally reflected from the surface of said cylinder.

4. An interconnection structure according to claim 1 further including a second dielectric planar waveguide means having at least two opposite surfaces through which light frequency signal modes are able to propagate by internal reflections from said surfaces resulting in zigzag paths through said second waveguide means, said second waveguide means being identical to said first waveguide means and having a thickness h and a refractive index of $n_w$, said second waveguide means having a surface being in contact with said surface of said light transparent coupling element at a second given contact area, wherein said internal reflections of said light frequency signal modes able to propagate in said second waveguide and in said coupling element are frustrated at said second given contact area such that light frequency signal modes can enter and exit said second waveguide means and said coupling element at said second given contact area.

5. An interconnection structure according to claim 4 wherein said light frequency modes able to propagate in said first waveguide means can be coupled out of said first waveguide means through frustrated reflections at said first given contact area into said coupling element, and can be coupled out of said coupling element through frustrated reflections at said second given contact area and can be coupled into said second waveguide means.

6. An interconnection structure according to claim 5 wherein said refractive index $n_s$ of said coupling element is greater in value than the refractive index $n_w$ of said at least first waveguide.

7. An interconnection structure according to claim 6 wherein a selected light frequency signal mode is reflected from said surfaces of said at least first waveguide means at an angel of $\theta_1$ with respect to the normal at a right angle to said at least two parallel surfaces, wherein the index of refraction external to said surface of said waveguide means in contact with said coupling element is $N_a$, wherein the index of refraction external to the other surface of said waveguide means not in contact with said coupling element is $N_b$, wherein $\lambda$ is the wavelength of said selected light frequency signal mode in a vacuum and wherein $$N = n_w \text{Sine } \theta_1$$

$$b = (N^2 - n_b^2)/(n_w^2 - n_b^2)$$

$$a = (n_b^2 - n_a^2)/(n_w^2 - n_b^2)$$

$$V = \frac{2\pi h}{\lambda} \sqrt{n_w^2 - n_b^2} .$$

8. An interconnection structure according to claim 7 wherein said selected light frequency signal mode enters said coupling element at an angle of $\theta_2$ with respect to the normal at a right angle to said at least two parallel surfaces, and $$\theta_2 = \text{Sine}^{-1} \frac{N}{n_s} .$$

* * * * *